F. DICKSON.
RESILIENT WHEEL.
APPLICATION FILED NOV. 27, 1918.
1,304,164.
Patented May 20, 1919.
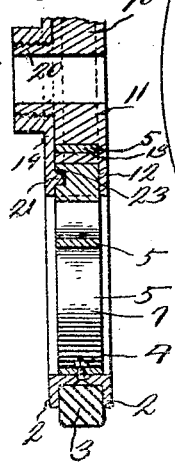
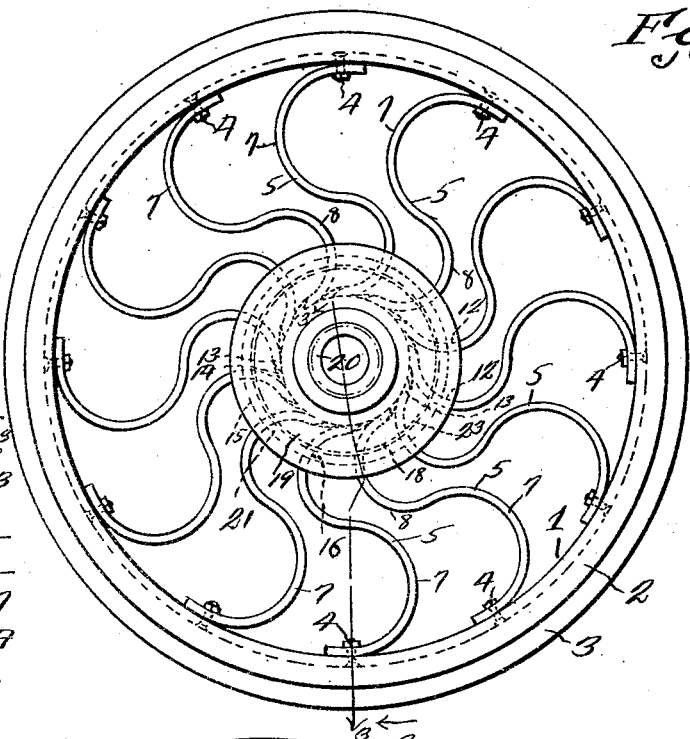
Fig. 1.
Fig. 2.
Fig. 3.
Inventor
F. Dickson

UNITED STATES PATENT OFFICE.

FREMONT DICKSON, OF SONORA, CALIFORNIA.

RESILIENT WHEEL.

1,304,164.　　　　Specification of Letters Patent.　　Patented May 20, 1919.

Application filed November 27, 1918. Serial No. 264,351.

*To all whom it may concern:*

Be it known that I, FREMONT DICKSON, a citizen of the United States, residing at Sonora, California, in the county of Tuolumne, State of California, have invented a new and useful Resilient Wheel; and I do hereby declare the following to be a full, clear, and exact description of the invention, such as will enable others skilled in the art to which it appertains to make and use the same.

The invention relates to resilient wheels, and more particularly to that type of resilient wheels known as spring wheels. It is the object of the invention to provide a spring wheel, wherein the resiliency of the same is accomplished by the flexing action of a series of spring spokes, said spokes being formed from flat pieces of spring steel, the spokes being formed in the shape of a compound curve.

A further object is to provide a hub structure, wherein the inner ends of the spring spokes will be securely wedged into slots when the spokes and hub structure are in assembled condition.

With the above and other objects in view, the invention consists of the arrangement and combination of parts as hereinafter described, shown in the drawings and claimed, it being understood that changes in the precise embodiment of the invention may be made, within the scope of what is claimed, without departing from the spirit of the invention.

In the drawings:—

Figure 1 is a side view of the spring wheel.

Fig. 2 is a sectional view through the spring wheel.

Fig. 3 is a sectional view taken on line 3—3 of Fig. 1.

Referring to the drawings, the numeral 1 designates a conventional form of a solid tire rim, said rim being provided with the usual flanges 2 for the reception of the solid tire 3, however whether the tire is of the solid rubber type or of the pneumatic type has no bearing on the invention, for the reason that both types of tires may be used on spring wheels, their choice being only a matter of added resiliency.

Secured to the rim 1, by means of bolts 4 are the ends of a series of spring spokes 5, which are bent so as to form compound curved portions 7 and 8, the curved portions 7 being of greater diameter than the curved portions 8, this for the reason that the larger curves 7 are near the rim of the wheel, therefore the greater flexing action will be near the rim of the wheel. The inner ends of the spokes 5 are held together by means of a hub 10, said hub comprising the axle spindle bearing section 11, which is provided with curved slots 12, which are of the same curvature as the inner ends of the spokes 5. The inner ends of the spokes are disposed in the curved slots 12, said inner ends being tapered as at 13 and are adapted to wedge into the tapered ends of the curved slots 14 when the inner ends of the springs are forced inwardly by means hereinafter set forth. The body section 10 is provided with an annular slot 15 on one of its faces, said slot intersecting the spoke slots 12. The inner ends of each of the spokes is provided with a notch 16, said notches being so positioned that when the spoke ends are in position, they will be slightly out of alinement with the annular slot 15, that is to say the shoulders 17 of the notches of the inner ends of the spokes will be inside the inner edge 18 of the annular slot. When the spoke ends are in this position, a plate 19 is threaded on to the projection 20 of the hub section 11. The plate 19, on its inner surface, is provided with an annular rib 21, said rib having one of its sides beveled as at 23. When the plate 19 is screwed on the projection 20, the rib 21 will register with the annular slot 15 of the hub section. As the plate 19 is screwed home, the beveled surface 23 of the rib 21, will engage the shoulders 17 of each of the spokes, then as the plate 19 is further screwed home the inner ends of the curved spokes will be forced inwardly into the tapered ends of the slots 12, thereby securing the ends of the spokes in such a way that they will not be easily displaced during the flexing of the spokes when the wheel is in use. This jamming into the tapered ends of the slots will prevent rattling of the inner end of the spokes. This is particularly true where spring spokes are used and by so securing the spokes, the possibility of their becoming loose from wear is obviated.

From the above it will be seen that a spring wheel is provided wherein the noise of operation is minimized and also a wheel wherein it is obvious that, when any of the spring spokes become disabled or broken, the disabled or broken spoke may be easily and quickly removed from the wheel and a new spoke placed therein.

The invention having been set forth, what is claimed as new and useful is:

In a vehicle wheel the combination with a hub of a plurality of spring spokes, the inner ends of said spokes being mounted in slots of one of the hub sections, said hub section being provided with an annular groove, notches on one side of the inner ends of the spokes, a retaining plate having a beveled annular rib for engaging the notches in the inner ends of the spokes whereby the inner ends of the spokes will be forced into the ends of the hub section slots and the annular rib on the retaining plate allowed to enter the annular slot in the hub section.

In testimony whereof I have signed my name to this specification in the presence of two subscribing witnesses.

FREMONT DICKSON.

Witnesses:
JOSEPH FRANCIS,
CURTIS NEWELL GEORGE.

Copies of this patent may be obtained for five cents each, by addressing the "Commissioner of Patents, Washington, D. C."